(12) United States Patent
Fukui et al.

(10) Patent No.: US 8,817,633 B2
(45) Date of Patent: Aug. 26, 2014

(54) TERMINAL SWITCHING METHOD, BASE STATION, AND COMMUNICATION SYSTEM

(75) Inventors: Noriyuki Fukui, Tokyo (JP); Tetsuya Mishuku, Tokyo (JP); Tatsuro Yajima, Tokyo (JP); Hidehiko Oyane, Tokyo (JP)

(73) Assignees: Mitsubishi Electric Corporation, Tokyo (JP); NTT DoCoMo, Inc., Tokyo (JP)

( * ) Notice: Subject to any disclaimer, the term of this patent is extended or adjusted under 35 U.S.C. 154(b) by 351 days.

(21) Appl. No.: 13/319,893

(22) PCT Filed: May 7, 2010

(86) PCT No.: PCT/JP2010/057829
§ 371 (c)(1),
(2), (4) Date: Jan. 6, 2012

(87) PCT Pub. No.: WO2010/131608
PCT Pub. Date: Nov. 18, 2010

(65) Prior Publication Data
US 2012/0099437 A1    Apr. 26, 2012

(30) Foreign Application Priority Data
May 12, 2009   (JP) ................................. 2009-115674

(51) Int. Cl.
*H04L 12/26* (2006.01)
*H04L 1/00* (2006.01)

(52) U.S. Cl.
CPC .................................. *H04L 1/0007* (2013.01)
USPC ....................................................... 370/241

(58) Field of Classification Search
None
See application file for complete search history.

(56) References Cited

U.S. PATENT DOCUMENTS

| 2010/0041445 A1* | 2/2010 | Qi et al. ........................ 455/574 |
| 2010/0323647 A1* | 12/2010 | Ryu et al. .................. 455/127.5 |
| 2012/0020337 A1* | 1/2012 | Ericson et al. ................ 370/336 |

FOREIGN PATENT DOCUMENTS

WO    2006 016457    2/2006

OTHER PUBLICATIONS

3GPP TR 25.896 V6.0.0, $3^{rd}$ Generation Partnership Project; Technical Specification Group Radio Access Network; Feasibility Study for Enhanced Uplink for UTRA FDD (Release 6), 3GPP, pp. 21-26, (Mar. 2004).

International Search Report Issued Jul. 13, 2010 in PCT/JP10/057829 Filed May 7, 2010.

\* cited by examiner

*Primary Examiner* — Andrew Lai
*Assistant Examiner* — Jamaal Henson
(74) *Attorney, Agent, or Firm* — Oblon, Spivak, McClelland, Maier & Neustadt, L.L.P.

(57) ABSTRACT

A terminal switching method for switching terminals, in a communication system in which HARQ processing is performed, to which a base station grants a transmission permission, from a terminal A to a terminal B includes notifying the terminal B of aborting of the transmission permission, setting a time point at which an HARQ process whose state of the HARQ processing is a retransmission waiting state with the terminal A is performed as a virtual starting point, setting a retransmission waiting window having a predetermined window length with the virtual starting point being regarded as its starting point, and notifying the terminal B of the transmission permission when there is no HARQ process having the retransmission waiting state with the terminal A, wherein the virtual starting point setting and the window setting are repeated until there is no HARQ process having the retransmission waiting state with the terminal A.

8 Claims, 7 Drawing Sheets

TERMINAL SWITCHING METHOD, BASE STATION, AND COMMUNICATION SYSTEM

FIELD

The present invention relates to a terminal switching method for switching terminals, in a communication system constituted by a base station and a plurality of terminals sharing wireless resources for performing communication, to which the base station grants a right of a data transmission, and to a base station and a communication system.

BACKGROUND

In recent various communication systems, an Automatic Repeat Request (ARQ) is employed as a method of correcting errors on a transmission path. For example, in a system called "Stop and Wait system", which is one system of the Automatic Repeat Request, when a base station receives data from a terminal, the base station performs error detection after demodulation and decoding of the data. The base station then returns an ACK signal upon determining that "there is no error", but returns a NACK signal upon determining that "there is an error", to the terminal, respectively. After transmitting the data, the terminal waits for the ACK/NACK signal to be returned. The terminal then transmits the next new data upon receiving the ACK signal (first transmission), but upon receiving the NACK signal retransmits the data for which the NACK signal is caused (retransmission). If the base station returns the NACK signal, then the base station stores the data corresponding to the NACK signal, and upon receiving the retransmitted data, performs combining of the corresponding stored data and the retransmitted data. By performing such a combining process, it is possible to virtually increase the signal reception level and to increase the probability of receiving signals with no error. A method of enhancing the error correction capability by performing the combining process in the above manner is called Hybrid ARQ (HARQ).

By the way, because there exists a blank time (a time during which any transmission is not performed) from when the terminal transmits the data until when it receives the ACK/NACK signal in the Stop and Wait system, the system is inefficient in terms of the usage of a communication cannel. To cope with this problem, for example, in an Enhanced Uplink, which is standardized in the 3GPP (3rd Generation Partnership Project), a plurality of HARQ processes of the Stop and Wait system are performed in parallel to achieve high efficiency in the usage of the communication channel. This type of system is generally called N-channel Stop and Wait. The "N" in the N-channel means the number of HARQ processes performed in parallel, which is, in the Enhanced Uplink, eight for 2 ms TTI and four for 10 ms TTI. The TTI (Transmission Time Interval) is a time length for which one data unit subjected to error correction coding is transmitted.

In the above 3GPP Enhanced Uplink, an E-DCH (Enhanced Dedicated Channel) is defined as one of the transport channels used in an uplink channel. An E-DPDCH (E-DCH Dedicated Physical Data Control Channel) is defined as a physical channel for the E-DCH. In this system, WCDMA (Wideband Code Division Multiple Access) is adopted as a wireless access system, and a plurality of communication physical channels, E-DPDCHs are defined on a wireless channel with providing a plurality of spread codes.

Meanwhile, in the WCDMA, data transmission is generally permitted for a plurality of terminals at the same time, but there is a limit in the permission. For example, when a base station receives data from a terminal A, data from the other terminals (a terminal B and a terminal C) than the terminal A, that perform transmission at the same time becomes a cause of interference. The amount of interference increases as the number of other terminals that perform transmission at the same time increases, and if the amount of interference exceeds a certain value, it becomes impossible to maintain the quality enough to properly receive the data from the terminal A, by which reception error is frequently caused. To avoid such a phenomenon, it is necessary to control the number of terminals that are permitted to perform the transmission at the same time or the sum of transmission powers of the terminals that perform the transmission at the same time not to exceed a predetermined threshold value. For example, if a transmission request from the terminal C is generated while the terminal A and the terminal B are performing communication with the base station, then the transmission powers of the terminal A and the terminal B are reduced, respectively, and a transmission permission is given to the terminal C.

Furthermore, as a modification of the control described above, there can be a method in which a transmission power of one terminal is set to zero, and a transmission power value that has become available by this setting is granted to another new terminal. This method can also serve as a method for switching terminals to which a transmission right is granted with time. For example, this method is described as "Time and Rate Scheduling" in Non Patent Literature 1 mentioned below.

In the "Time and Rate Scheduling", after a certain amount of time has elapsed, a terminal to which data transmission is granted is switched by instructing a resource release (Zero Grant) to a terminal to which wireless resources are allocated (given Grant) so far and giving the resources (giving Grant) to another terminal. At this time, one thing that must be considered is the above-described process of the HARQ. That is, when there are still the data to be retransmitted from the terminal A after instructing the Zero Grant to the terminal A (in a state where the base station had transmitted the NACK signal), it is desirable to issue the Grant to the next terminal B after completing the HARQ processing. When the Grant is issued to the terminal B without completing the HARQ processing, the terminal A continues the retransmission, which becomes a cause of interference to data reception from the terminal B. Furthermore, at the time of issuing the Grant to the terminal B, the base station deletes data for which the NACK signal is returned to the terminal A, from a memory buffer. Therefore, even when the terminal A is given the Grant once again after that and then curries out retransmission, the combining effect of the HARQ can not be obtained.

CITATION LIST

Non Patent Literature

Non Patent Literature 1: 3GPP TR 25.896 V6.0.0, Section 7.1.2 and Section 7.1.5.2, March 2004

SUMMARY

Technical Problem

In the Enhanced Uplink of 3GPP described above, a time from when the transmission of the NACK signal until when the retransmitted data are received in response to the NACK signal becomes a fixed time. Therefore, when switching a terminal to which the data transmission is granted from the terminal A to the terminal B while considering the HARQ processing, a retransmission waiting window is set for the above-mentioned fixed time from a time point as a starting point, and wait for the retransmission is supposed to be made until its expiration of the fixed time (ending of the retransmission waiting window). The first time of the starting point when switching the terminals can be set to a predetermined time corresponding to a time from when the Zero Grant is transmitted to when the Zero Grant is recognized in the terminal and there is no arrival of new data (a certain period of time after the Zero Grant is transmitted).

However, when just a single process of retransmission does not leads to "there is no error", the base station returns the NACK signal again, and enters the retransmission waiting state again. Also in this case, although the retransmission waiting window is set, because the length of the retransmission waiting window is always a fixed time, the retransmission waiting window is set even to a time slot in which the HARQ processing has been completed and the retransmitted data never arrives. Therefore, there is a problem that the time for switching a terminal to which data transmission is permitted (the time from transmission of the Zero Grant to actual terminal switching) is long.

The present invention has been achieved in view of the aforementioned, and an object of the present invention is to provide a terminal switching method, a base station, and a communication system, with which it is possible to shorten the time for switching to a switching destination terminal while maintaining the reception quality by completing an HARQ processing for a terminal granted before the switching when switching a terminal to which a transmission permission is to be granted in a system in which a plurality of HARQ processes are run at the same time.

Solution to Problem

In order to solve the above-described problem and achieve an object, the present invention provides a terminal switching method for switching terminals, in a communication system in which HARQ processing is performed between a base station and the terminals, to which the base station grants a transmission permission, from a first terminal that is one of the terminals to a second terminal that is another one of the terminals, the terminal switching method comprising: an abort notifying step of notifying the first terminal of aborting of transmission permission; a virtual starting point setting step of monitoring a state of HARQ processing with the first terminal for each HARQ process that is a processing unit of the HARQ processing, and setting a time point at which an HARQ process whose state of the HARQ processing is a retransmission waiting state is performed as a virtual starting point; a window setting step of setting a retransmission waiting window having a predetermined window length with the virtual starting point being regarded as its starting point; and a transmission permitting step of notifying the second terminal of transmission permission when there is no HARQ process having the retransmission waiting state with the first terminal, wherein the virtual starting point setting step and the window setting step are repeated until when there is no HARQ process having the retransmission waiting state with the first terminal.

Advantageous Effects of Invention

The terminal switching method, the base station, and the communication system according to the present invention enable, when setting a retransmission waiting window for completing an HARQ process to switch a terminal to which data transmission is to be permitted, setting an end point of the latest HARQ process in a NACK state as a virtual starting point in the last retransmission waiting window and setting a predetermined fixed time from the virtual starting point as the retransmission waiting window, so that it is possible to shorten the time for switching to a switching destination terminal while maintaining the reception quality by completing HARQ processing for a terminal granted before the switching.

DESCRIPTION OF EMBODIMENTS

Embodiments of a terminal switching method, a base station, and a communication system according to the present invention will be described below in detail with reference to the drawings. The present invention is not limited to the embodiments.

First Embodiment

Figure 1:
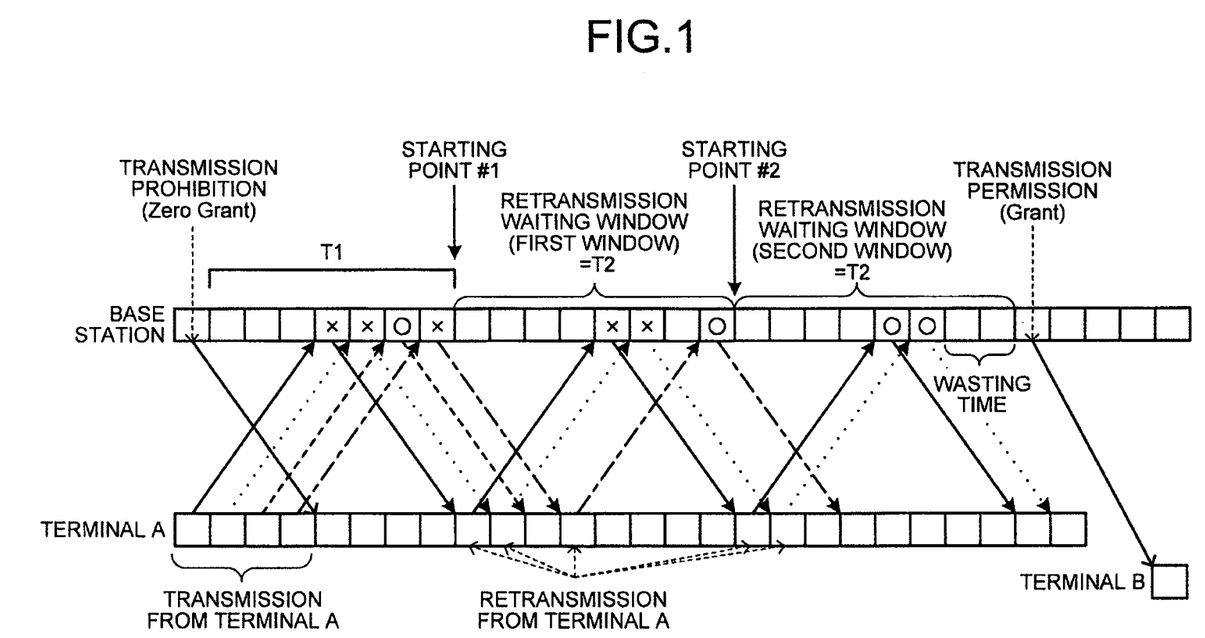
FIG. 1 is a diagram showing an inefficient example of setting a retransmission window.
Figure 2:
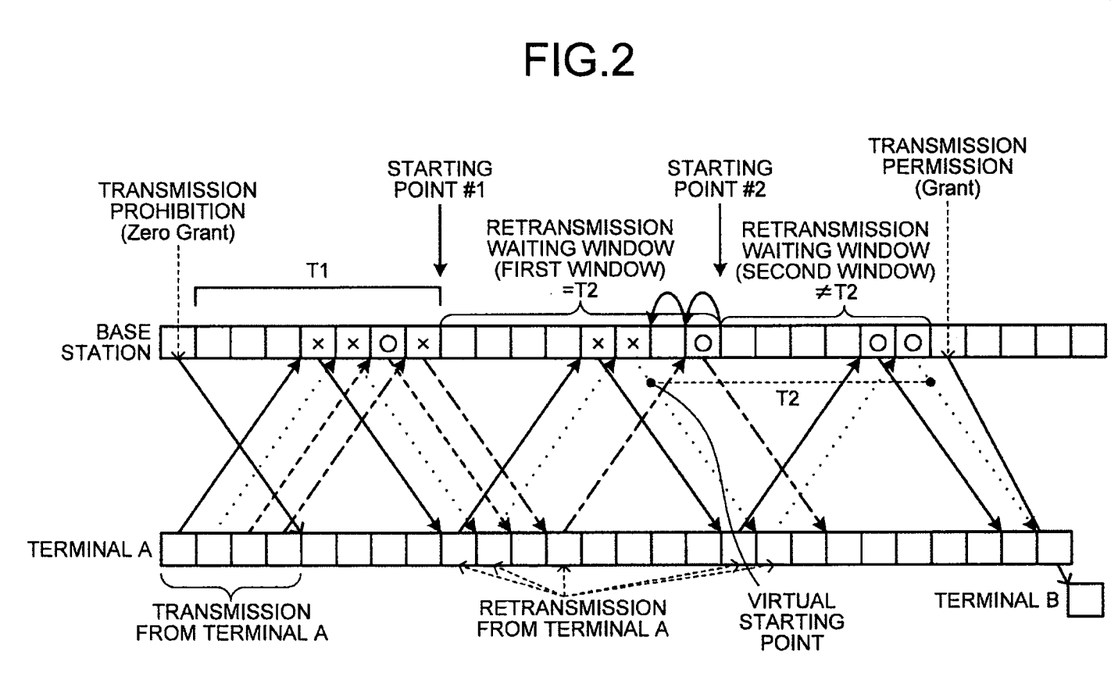
FIG. 2 is a diagram showing an example of setting a retransmission window, to which a terminal switching method according to a first embodiment is applied.

FIG. 1 is a diagram showing in an inefficient example of setting a retransmission window, which occurs in the case of using a conventional technique. FIG. 2 is a diagram showing an example of setting a retransmission window, to which a terminal switching method according to a first embodiment of the present invention is applied. A communication system according to the present embodiment is constituted by a base station and a plurality of terminals, and an HARQ is implemented between the base station and the terminals. The base station according to the present embodiment performs control the terminal carrying out data transmission to be switched. In this example, a terminal to which the data transmission is to be permitted is switched by instructing a resource release (Zero Grant) to a terminal to which wireless resources are allocated (Grant is given) and allocating the resources (giving Grant) to another terminal.

When performing the control of switching a terminal to perform the data transmission, it is desirable for the base station to perform switching to the next terminal after terminating HARQ processing with a terminal granted before the switching. A conventional communication system sets a predetermined waiting time (a retransmission waiting window), and performs the switching after waiting for the retransmitted data. In the example shown in FIG. 1, a time point when a predetermined time (T1) has elapsed from transmission of the Zero Grant is set as a starting point #1. A time corresponding to a period of time from when the Zero Grant is transmitted to when the terminal recognizes the Zero Grant and no data arrival is set as T1. The starting point is a time point at which a retransmission waiting window starts. In the conventional communication system, the retransmission waiting window is a fixed value (T2). In the drawing, a circle indicates that reception has been correctly achieved, and a cross indicates that reception has not been correctly achieved.

The drawing depicts the case where switching of a terminal is performed, to which data transmission is permitted, from a terminal A to a terminal B. It is assumed that every single rectangular block on sides of the "base station" and the "terminal A" corresponds to a unit of performing one HARQ process, and verification of data transmission data (confirmation based on an ACK/NACK signal) is performed on that unit basis. Hereinafter, this unit for the verification of the data transmission is referred to as one HARQ process. First, it is assumed that data corresponding to the leftmost HARQ process in the drawing is transmitted, and the data is not received correctly in the base station (a cross in the drawing). Furthermore, the data is not received correctly in the base station in the next HARQ process (the second cross from the left in the drawing), the data is received correctly in the HARQ process after the next (the circle in the drawing), and the data is not received correctly in the third next HARQ process (a cross next to the circle in the drawing).

On the other hand, in order to switch a terminal to which data transmission is permitted from the terminal A to the terminal B, the base station transmits transmission prohibition (Zero Grant) to the terminal A, and after the elapse of T1, waits for retransmission of data for a period of a retransmission waiting window (first window). In this period, the switching to the terminal B is performed if all the pieces of data that have not been received correctly in the last reception can be received correctly. However, in the example shown in FIG. 1, even in the first retransmission waiting window, it is assumed that the first two blocks of data (data corresponding to two HARQ processes) from among the data corresponding to the three HARQ processes that have not been received correctly in the last processing are not received correctly, but the third block of data is received correctly. In this case, in the conventional communication system, as indicated by a starting point #2 shown in FIG. 1, a second retransmission waiting window is set with an ending point of the first retransmission waiting window being regarded as its starting point. Because the length of the retransmission waiting window is fixed, the length of the second retransmission waiting window is also T2.

In the second retransmission waiting window, assuming that the data corresponding to the two HARQ processes, that have not been received correctly in the first retransmission waiting window, are, in turn, received correctly, the base station transmits a transmission permission to the terminal B after ending the second retransmission waiting window. In this manner, the switching to the terminal B is completed. In this case, as shown in FIG. 1, the transmission permission is not transmitted to the terminal B during a period from when all the pieces of data are received correctly (consecutive circles in the drawing) to when the second retransmission waiting window is terminated, so that a time corresponding to two HARQ processes becomes a wasting time.

In the present embodiment, in order to reduce such a wasting time occurring in the conventional communication system, the switching of terminals is performed as shown in FIG. 2. Specifically, in the present embodiment, when setting a retransmission waiting window at a timing that becomes its starting point, each HARQ process performed in the last retransmission waiting window is confirmed, and a temporally latest HARQ process from among the HARQ processes that are still in a retransmission waiting state (a state where a NACK signal is transmitted and retransmitted data corresponding to the NACK signal are not received yet) is set as a virtual starting point. A retransmission waiting window is set such that a time point when the fixed time T2 has elapsed from the virtual starting point becomes regarded as an expiration time point of the new retransmission waiting window.

In the example shown in FIG. 2, in the same manner as FIG. 1, it is assumed that data of three HARQ processes are not received correctly at the time of a starting point #1, and data of the first two HARQ processes are not received correctly at the time of a starting point #2. In this case, in the present embodiment, the virtual starting point is set at the time of the starting point #2 as in the above-described manner. The virtual starting point in this case is an ending point of the second HARQ process for which the data are not received correctly, that is, a time point earlier than the starting point #2 by two HARQ processes. A period of time T2 from the virtual starting point is then set as the second retransmission waiting window. In this case, because the period from the virtual starting point to the starting point #2 is a time having already elapsed, the time for actually waiting for retransmission from the starting point #2 becomes shorter than T2.

Figure 3:
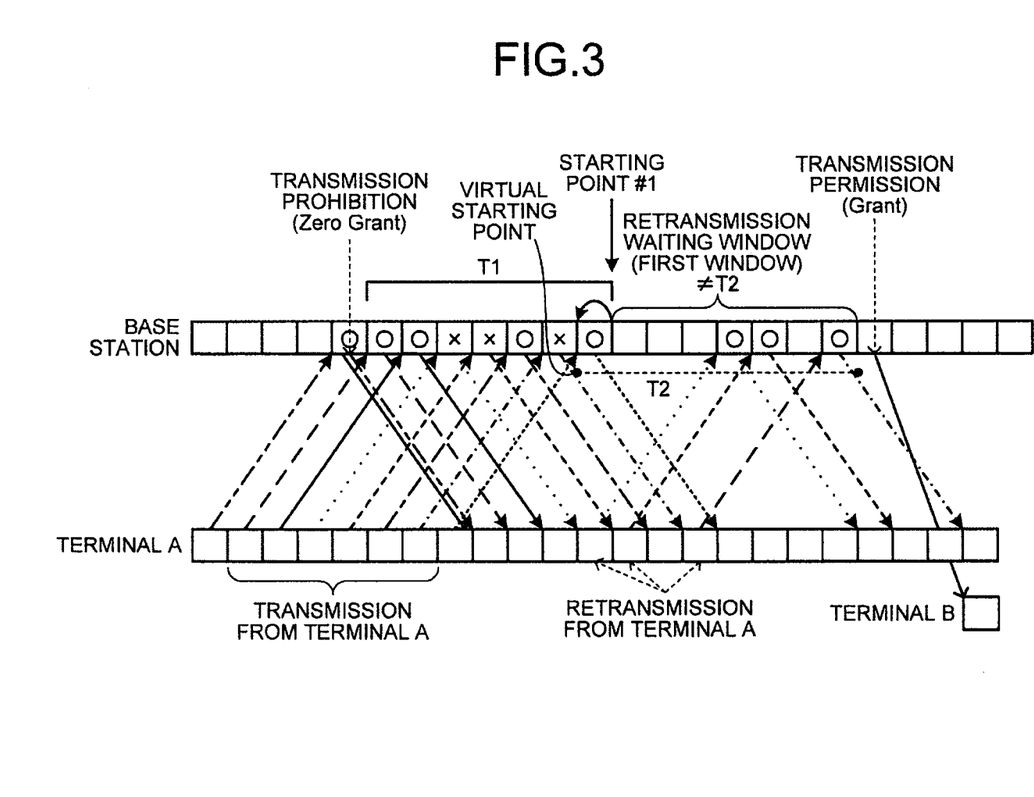
FIG. 3 is a diagram showing an example of performing window setting according to the first embodiment in a first retransmission waiting window.

In FIG. 2, there has been shown an example in which the virtual starting point is employed at the time of setting the second retransmission waiting window. However, the present embodiment is not limited to this example, and the virtual starting point may be employed when setting the first retransmission waiting window. FIG. 3 is a diagram showing an example of the window setting according to the present embodiment in the first retransmission waiting window. In the example shown in FIG. 3, because there is no last retransmission waiting window, each HARQ process performed before the starting point #1 is confirmed, and a temporally latest HARQ process from among HARQ processes that are still in a retransmission waiting state is set as the virtual starting point. A period of the time T2 from the virtual starting point is then set as the first retransmission waiting window.

Figure 4:
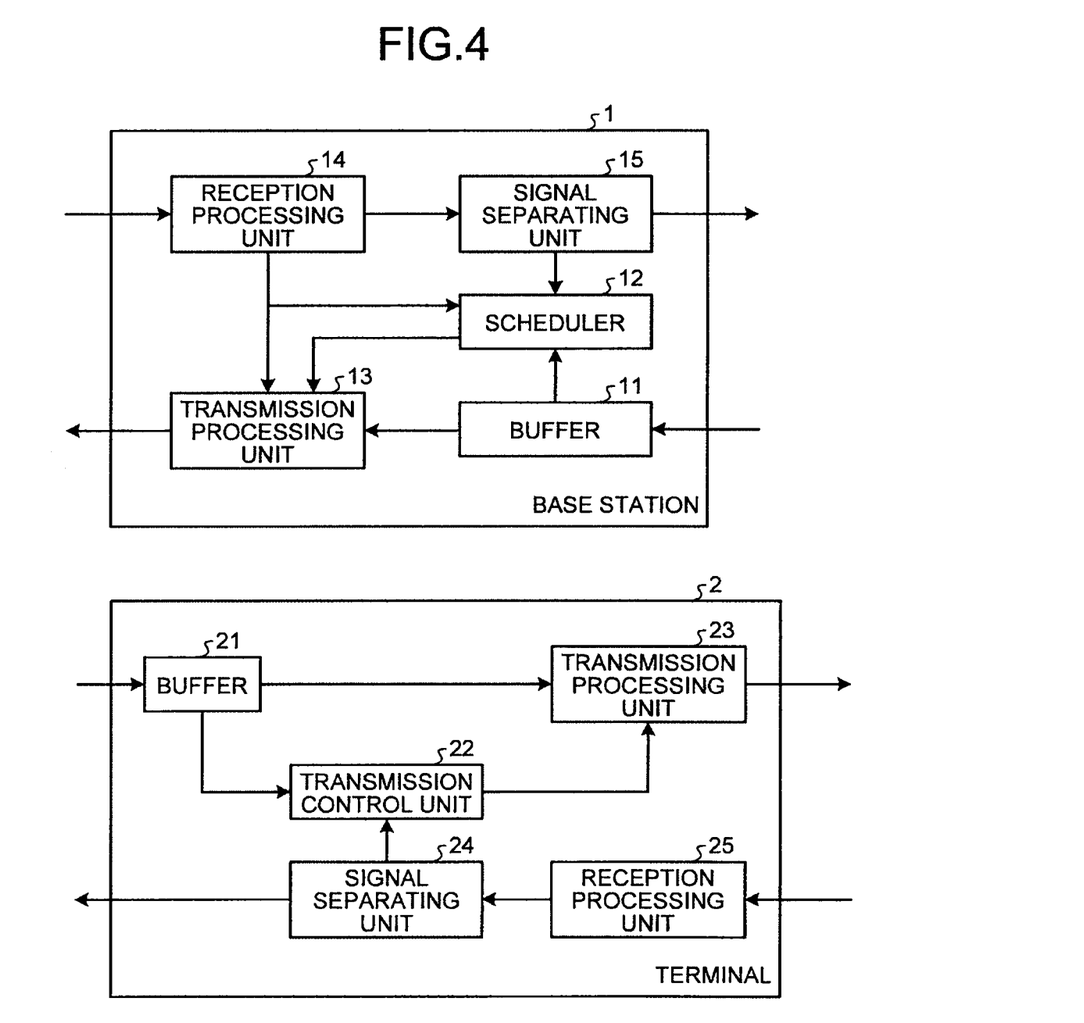
FIG. 4 is a diagram showing an example of a configuration of a communication system for implementing the terminal switching method according to the first embodiment.

FIG. 4 is a diagram showing an example of a configuration of a communication system for implementing the terminal switching method according to the present embodiment. The communication system shown in FIG. 4 is constituted by a base station 1 and a terminal 2. Although only one terminal 2 is shown in FIG. 4, in a practical configuration, there are a plurality of terminals having the same configuration as the terminal 2.

The base station 1 includes a buffer 11, a scheduler 12, a transmission processing unit 13, a reception processing unit 14, and a signal demultiplexing unit 15. The buffer 11 stores user data for the terminal 2, and manages the user data for each destination terminal. Furthermore, it is possible to manage the data for each data type. The scheduler 12 links data for the terminal 2 with wireless resources of a downlink channel (downlink scheduling), and performs an operation for determining transmission permission in response to a transmission request from the terminal 2 (uplink scheduling). The transmission processing unit 13 performs encoding and modulation of transmission data (user data or a control signal) by using an instruction from the reception processing unit 14, an instruction from the scheduler 12, and a result of the downlink scheduling, and performs transmission to the terminal 2.

The reception processing unit 14 receives data transmitted from the terminal 2, and performs demodulation, decoding, and error detection of the data. The reception processing unit 14 includes a memory buffer for HARQ, and transmits an instruction for transmitting an ACK signal when a result of the error detection is "there is no error" and an instruction for transmitting a NACK signal when the result of the error detection is "there is an error" to the transmission processing unit 13. The reception processing unit 14 further notifies the scheduler 12 of the result of the error detection. The reception processing unit 14 transmits data for which it is determined that "there is no error" to the signal demultiplexing unit 15. The signal demultiplexing unit 15 separates reception data into the control signal and the user data, and transmits the control signal to the scheduler 12. The control signal to be transmitted at this stage includes the transmission request from the terminal 2, an accumulated amount of a user data buffer of the terminal and the like. The scheduler 12 determines a terminal to which a transmission permission is granted by using these kinds of information included in the control signal. Furthermore, after transmitting the Zero Grant, the scheduler 12 performs the setting of the retransmission waiting window described above.

The terminal 2 is constituted by a buffer 21, a transmission control unit 22, a transmission processing unit 23, a signal demultiplexing unit 24, and a reception processing unit 25. The buffer 21 is intended to store user data for the base station 1 and occasionally manages data according to its data type. The transmission control unit 22 checks the accumulated amount of the buffer 21, determines whether or not to transmit a transmission request based on the accumulated amount, further determines whether or not to transmit the data at the next transmission timing based on the received ACK/NACK signal and information of the Grant/Zero Grant and whether the data to be transmitted are new data or retransmission data, and accordingly sends an instruction to the transmission processing unit 23. The transmission processing unit 23 performs encoding and modulation of transmission data based on the instruction from the transmission control unit 22, and transmits the data to the base station 1.

The reception processing unit 25 receives the data transmitted from the base station 1, and performs demodulation, decoding, and error detection of the data. The reception processing unit 25 transmits correctly received data to the signal demultiplexing unit 24. The signal demultiplexing unit 24 separates the received data into the control signal and the user data, and transmits the control signal to the transmission control unit 22. The control signal to be sent herein includes the ACK/NACK signal, the Grant/Zero Grant signal and the like from the base station 1.

Although it is assumed that the control signal and the user data are multiplexed on one physical channel, they may be transmitted and received through different physical channels separately. For example, it is assumed that a physical channel intended separately for a spread code is used in the case of WCDMA. In this case, spread codes of the physical channels through which the control signal and the user data are transmitted, respectively, are determined in advance by both the base station 1 and the terminal 2.

As described above, in the present embodiment, after transmitting the Zero Grant in order to switch a terminal to which data transmission is permitted, when setting the retransmission waiting window for completing the HARQ process, the ending point of the latest HARQ process that is in the NACK state with the last retransmission waiting window (in the case of setting the first retransmission waiting window, a period before the first one) is set as the virtual starting point, and a period of a predetermined fixed time from the virtual starting point is set as the retransmission waiting window. Thereby, it is possible to shorten the switching time, as compared to conventional terminal switching methods, while maintaining a certain level of the reception quality by completing HARQ processing for a terminal granted before the switching.

Second Embodiment

Figure 5:
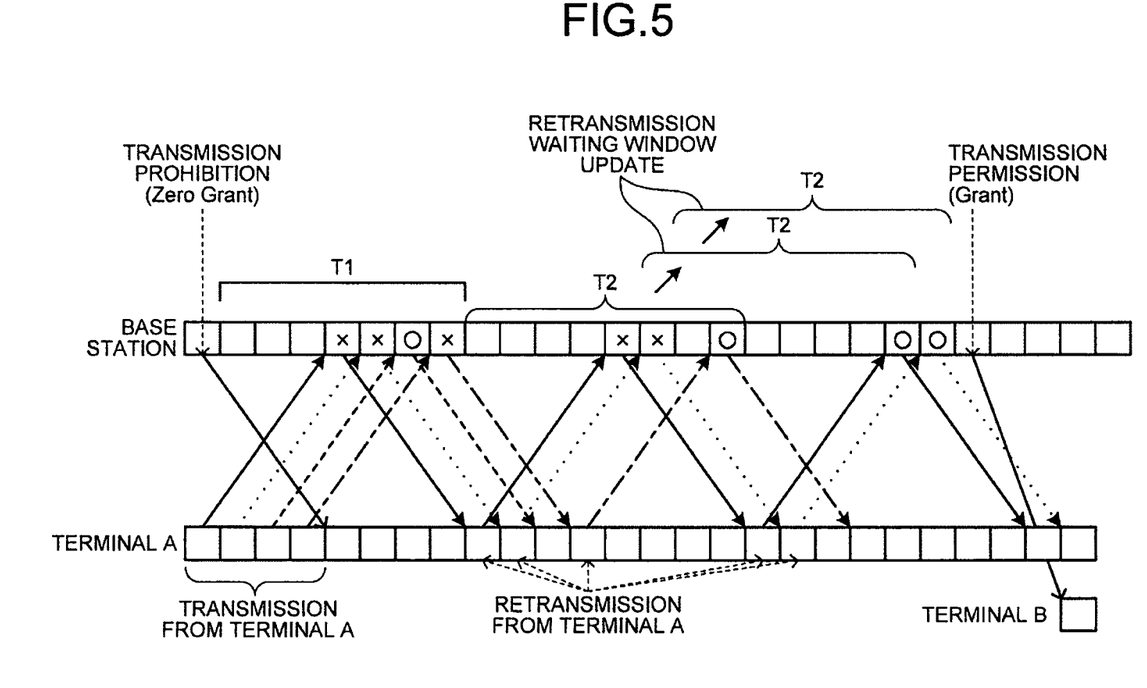
FIG. 5 is a diagram showing a terminal switching method according to a second embodiment.

FIG. 5 is a diagram showing a terminal switching method according to a second embodiment of the present invention. In the first embodiment, a time point at which a retransmission waiting window ends is set as a starting point, and the retransmission window is set at the starting point. However, in the present embodiment, the retransmission waiting window is updated every time the NACK signal is transmitted.

When switching a terminal to which data transmission is to be permitted from the terminal A to the terminal B, as shown in FIG. 5, in the same manner as the first embodiment, the Zero Grant is first transmitted to the terminal A, a time point when a predetermined time (T1) has elapsed therefrom is set as a starting point #1, and a retransmission waiting window having a length of a fixed time T2 is set thereat. In the present embodiment, when a NACK signal is transmitted (a cross in FIG. 5) before the once-set retransmission waiting window ends, the base station resets a retransmission waiting window having the length of T2 with the transmission of the NACK signal being regarded as the starting point. When the NACK signal is transmitted again before the retransmission waiting window ends, the retransmission waiting window having the length of T2 is reset with the transmission of that NACK signal being regarded as the starting point. In the present embodiment, because it can be determined that there is no HARQ process having a retransmission waiting state when the latest retransmission waiting window has expired, it is possible to transmit the Grant to the next terminal B. Operations of the present embodiment other than those described above are the same as the operations of the first embodiment. Furthermore, the configuration of a communication system according to the present embodiment is the same as that of the first embodiment.

As described above, in the present embodiment, it is configured that, when a NACK signal is transmitted before the set retransmission waiting window expires, a retransmission waiting window having the length of T2 is reset with the transmission of the NACK signal being regarded as the starting point. Therefore, it is possible to achieve a similar effect to that of the first embodiment without employing any virtual starting points.

Third Embodiment

Figure 6:
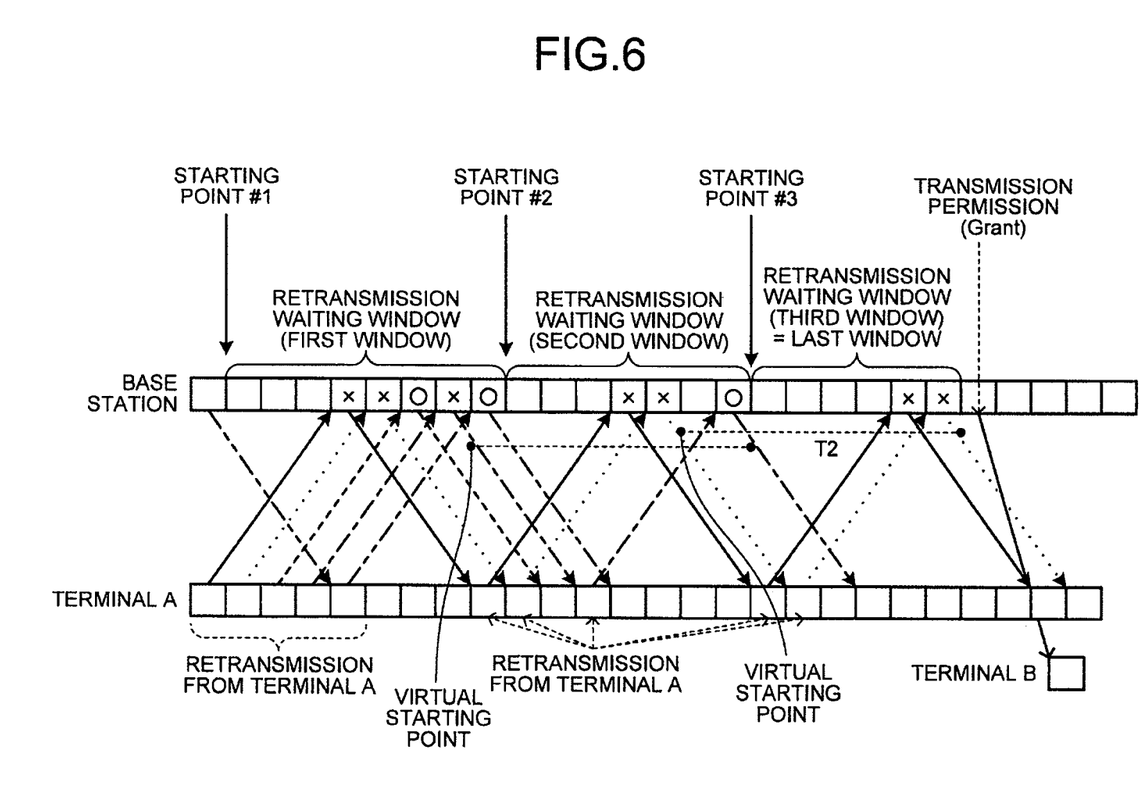
FIG. 6 is a diagram showing a terminal switching method according to a third embodiment.

FIG. 6 is a diagram showing a terminal switching method according to a third embodiment of the present invention. The first and second embodiments have the assumption that the Grant is transmitted to the next terminal always after completing the HARQ processing of a terminal granted before the switching. However, if the communication quality is considerably poor between the terminal granted before the switching and the base station, there can be a case that the HARQ process is not completed even with taking many attempts of the retransmission. Furthermore, many attempts of retransmission exclusively for an HARQ process when the process relating to a specific terminal is only in a retransmission waiting state can adversely lead to degradation of a system throughput because it causes a unused state of an HARQ process of other terminals to be continued. To avoid such a situation, in the present embodiment, it is configured to give a Grant to the next terminal when the number of retransmissions reaches a predetermined threshold value.

In the example shown in FIG. 6, the threshold value of the number of retransmissions is set to three times. In the example shown in FIG. 6, the Grant is transmitted to the terminal B at the time when the third retransmission waiting window expires, even though two HARQ processes having a retransmission waiting state still remain.

Figure 7:
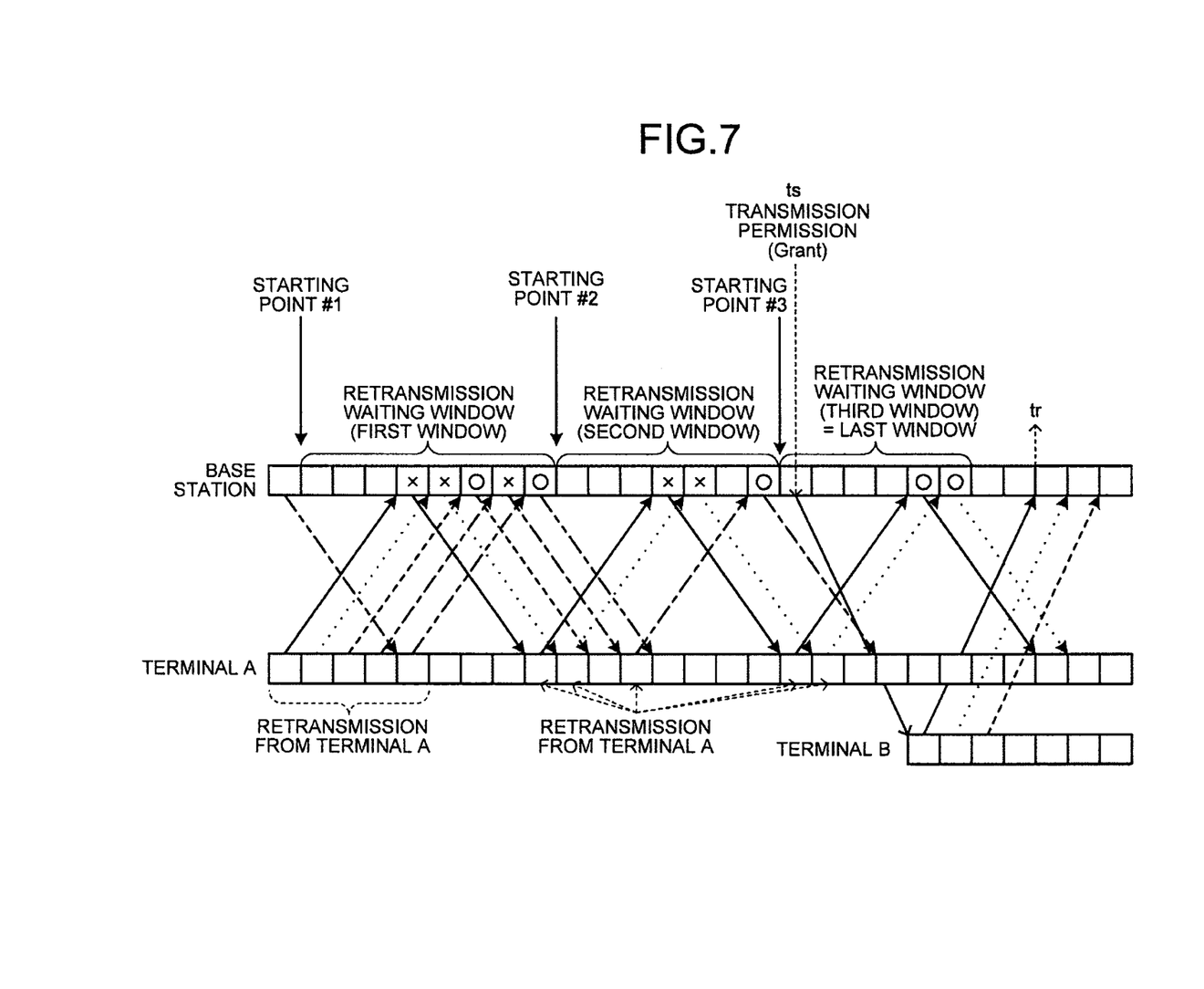
FIG. 7 is a diagram showing a switching method using estimation in the third embodiment.

When the threshold value is set for the number of retransmissions, it is possible to estimate a time point "after which wireless resources are not allocated to the terminal A (a terminal granted before the switching)" (an upper limit time point up to which data is transmitted from the terminal A). FIG. 7 is a diagram showing a terminal switching method using this estimation. FIG. 7 depicts the case where the threshold value is set to three in the same manner as the case shown in FIG. 6. When setting the third retransmission waiting window at a starting point #3, it is possible to estimate that a time point at which that window expires is the last timing for allocating the wireless resources to the terminal A. Therefore, by using this estimation, it is possible to make the timing of giving the Grant to the terminal B earlier than that in the example shown in FIG. 6.

Specifically, for example, it is possible to determine a time point for transmitting the Grant as follows. First, when the Grant is transmitted to the terminal B at a time point ts, an arrival time point tr of data transmitted from the terminal B is estimated based on the Grant. This estimation is performed based on a result of transmission and reception and the like so far between the terminal B and the base station. An expiration time point of the third retransmission waiting window is then estimated, and when tr is beyond the estimated time point, it is possible to transmit the Grant to the terminal B at the time point ts corresponding to tr. In other words, it is only necessary to transmit the Grant after a time point when going back from the estimated time point described above by an estimated time from when the Grant is transmitted to the terminal B to when the first data arrives from the terminal B. Operations of the present embodiment other than those described above are the same as the operations of the first embodiment.

Although the threshold value is set for the number of retransmissions when performing operations of the first embodiment, the present embodiment is not limited to this manner, and the threshold value may be set for the number of retransmissions when performing operations of the second embodiment. Furthermore, when performing operations of the second embodiment, the time point for transmitting the Grant may be made to be earlier by estimating the expiring time of the retransmission waiting window in such a manner as the example shown in FIG. 7.

As described above, in the present embodiment, it is configured to set an upper limit for the number of retransmissions when waiting for retransmission in order to complete HARQ processing of a terminal granted before the switching. As a result, it is possible to prevent degradation of the throughput due to the continuation of the retransmission when the communication quality is considerably poor. Furthermore, by setting the upper limit for the number of retransmissions, it is possible to estimate an upper limit time point up to which data are transmitted from the terminal A granted before the switching. This makes it possible to obtain a time point for transmitting the Grant such that data transmission starts from a terminal granted after the switching after the estimated time point, and therefore it is possible to make the time point for transmitting the Grant earlier than the case of transmitting the Grant after the retransmission waiting window ends.

INDUSTRIAL APPLICABILITY

As described above, the terminal switching method, the base station, and the communication system according to the present invention are useful for a system that switches a terminal to which a data transmission right is granted, and more particularly suitable for a system that starts communication with a switching destination terminal after completing HARQ processing of a terminal granted before the switching.

REFERENCE SIGNS LIST

1 BASE STATION
2 TERMINAL
11, 21 BUFFER
12 SCHEDULER
13, 23 TRANSMISSION PROCESSING UNIT
14, 25 RECEPTION PROCESSING UNIT
15, 24 SIGNAL DEMULTIPLEXING UNIT
22 TRANSMISSION CONTROL UNIT

The invention claimed is:

1. A terminal switching method for switching terminals, in a communication system in which HARQ processing is performed between a base station and the terminals, to which the base station grants a transmission permission, from a first terminal that is one of the terminals to a second terminal that is another one of the terminals, a retransmission waiting window for the HARQ processing having a predetermined window length, the terminal switching method comprising:
  an abort notifying step of notifying the first terminal of aborting of transmission permission such that the first terminal will not transmit new data, which the first terminal has not previously attempted to transmit, after receiving the abort notification;
  an initial window setting step of setting a retransmission waiting window of the predetermined window length,
  a virtual starting point setting step of monitoring a state of HARQ processing with the first terminal for each HARQ process that is a processing unit of the HARQ processing, and setting a time point at which an HARQ process whose state of the HARQ processing is a retransmission waiting state is performed as a virtual starting point;
  a window setting step of setting a retransmission waiting window having the predetermined window length with the virtual starting point being regarded as its starting point; and
  a transmission permitting step of notifying the second terminal of transmission permission when there is no HARQ process having the retransmission waiting state with the first terminal, wherein
  the virtual starting point setting step and the window setting step are performed again when there is an HARQ process having the retransmission waiting state with the first terminal, and
  for at least once, the virtual starting point is set at a time point that is earlier than an end of the retransmission waiting window in the virtual starting point setting step.

2. The terminal switching method according to claim 1, wherein the transmission permitting step is executed after the retransmission waiting window for which it is determined that there is no HARQ process having the retransmission waiting state is terminated.

3. The terminal switching method according to claim 1, wherein the transmission permitting step is executed, when it is determined that there is no HARQ process having the retransmission waiting state, before the retransmission waiting window for which the determination has been made is terminated.

4. The terminal switching method according to claim 1, wherein
the initial window setting step is performed after a predetermined waiting time elapses from notification made in the abort notifying step, and
the virtual starting point setting step is performed after the waiting time passes.

5. The terminal switching method according to claim 1, wherein when the number of times the retransmission waiting window is set reaches a predetermined upper limit value, repetition of the virtual starting point setting step and the window setting step is aborted, and the second terminal is notified of transmission permission after a lastly set retransmission waiting window is terminated.

6. The terminal switching method according to claim 1, wherein when the number of times the retransmission waiting window is set reaches a predetermined upper limit value, repetition of the virtual starting point setting step and the window setting step is aborted, setting an ending time point of a lastly set retransmission waiting window as an estimated ending time point, a required time from when the second terminal is notified of transmission permission to when first data are received from the second terminal in response to the transmission permission, and the second terminal is notified of the transmission permission after a time point that goes back from the estimated ending time point by the required time.

7. A base station that performs HARQ processing with terminals, and switches a terminal to which a transmission permission is granted from a first terminal to a second terminal, a retransmission waiting window for the HARQ processing having a predetermined window length, the base station comprising
a scheduler that notifies the first terminal of aborting of transmission permission such that the first terminal will not transmit new data, which the first terminal has not previously attempted to transmit, after receiving the abort notification, sets a retransmission waiting window of the predetermined window length as an initial window, monitors a state of HARQ processing with the first terminal for each HARQ process that is a processing unit of HARQ, sets a time point at which an HARQ process whose state of the HARQ processing is a retransmission waiting state is performed as a virtual starting point, sets a retransmission waiting window having the predetermined window length with the virtual starting point being regarded as a starting point, and when there is no HARQ process having the retransmission waiting state with the first terminal, notifies the second terminal of the transmission permission, wherein
the scheduler again performs setting of the virtual starting point and setting of the retransmission waiting window when there is an HARQ process having the retransmission waiting state with the first terminal, and
the scheduler sets, for at least once, the virtual starting point at a time point that is earlier than an end of the retransmission waiting window.

8. A communication system comprising:
a base station that performs HARQ processing with terminals, and switches a terminal to which a transmission permission is granted from a first terminal to a second terminal, a retransmission waiting window for the HARQ processing having a predetermined window length, the base station comprising
a scheduler that notifies the first terminal of aborting of transmission permission such that the first terminal will not transmit new data, which the first terminal has not previously attempted to transmit, after receiving the abort notification, sets a retransmission waiting window of the predetermined window length as an initial window, monitors a state of HARQ processing with the first terminal for each HARQ process that is a processing unit of HARQ, sets a time point at which an HARQ process whose state of the HARQ processing is a retransmission waiting state is performed as a virtual starting point, sets a retransmission waiting window having the predetermined window length with the virtual starting point being regarded as a starting point, and when there is no HARQ process having the retransmission waiting state with the first terminal, notifies the second terminal of the transmission permission, wherein
the scheduler again performs setting of the virtual starting point and setting of the retransmission waiting window when there is an HARQ process having the retransmission waiting state with the first terminal; and
a plurality of terminals, wherein
the scheduler sets, for at least once, the virtual starting point at a time point that is earlier than an end of the retransmission waiting window.

* * * * *